US009096137B2

(12) United States Patent
Chauhdary et al.

(10) Patent No.: US 9,096,137 B2
(45) Date of Patent: Aug. 4, 2015

(54) METHOD FOR CHARGING AN ELECTRIC VEHICLE INCLUDING A BATTERY

(71) Applicant: LSIS CO., LTD., Anyang-si, Gyeonggi-do (KR)

(72) Inventors: Sajjad Hussain Chauhdary, Seoul (KR); Kwang Soo Hahn, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/353,014

(22) PCT Filed: Oct. 19, 2012

(86) PCT No.: PCT/KR2012/008631
§ 371 (c)(1),
(2) Date: Aug. 11, 2014

(87) PCT Pub. No.: WO2013/058617
PCT Pub. Date: Apr. 25, 2013

(65) Prior Publication Data
US 2014/0350758 A1   Nov. 27, 2014

Related U.S. Application Data

(60) Provisional application No. 61/549,253, filed on Oct. 20, 2011, provisional application No. 61/549,263, filed on Oct. 20, 2011, provisional application No. 61/549,266, filed on Oct. 20, 2011, provisional application No. 61/549,270, filed on Oct. 20, 2011, provisional application No. 61/606,488, filed on Mar. 5, 2012.

(51) Int. Cl.
*B60L 11/00* (2006.01)
*B60L 11/18* (2006.01)
*H02J 7/00* (2006.01)

(52) U.S. Cl.
CPC ......... *B60L 11/1809* (2013.01); *B60L 11/1824* (2013.01); *B60L 11/1825* (2013.01);
(Continued)

(58) Field of Classification Search
None
See application file for complete search history.

(56) References Cited

U.S. PATENT DOCUMENTS

2010/0306033 A1\* 12/2010 Oved et al. ...................... 705/10
2011/0144823 A1    6/2011 Muller et al.
(Continued)

FOREIGN PATENT DOCUMENTS

KR   10-2010-0105109   9/2010
KR   10-2011-0076858   7/2011

OTHER PUBLICATIONS

Boulanger, et al., "Vehicle Electrification: Status and Issues," Proceedings of the IEEE, vol. 99, No. 6, Jun. 2011, pp. 1116-1138.

*Primary Examiner* — Adam Alharbi
(74) *Attorney, Agent, or Firm* — Lee, Hong, Degerman, Kang & Waimey

(57) ABSTRACT

An electric vehicle comprising a battery charges the battery through an electric vehicle power supply device, and transmits to a user terminal device a first charging information notification message, which includes information on a current charging status of the battery. The electric vehicle detects an interruption to the charging of the battery on the basis of the current charging status of the battery, and checks the cause for the interruption to the charging of the battery. When the interruption to the charging of the battery is detected, the electric vehicle transmits to the user terminal device a second charging information notification message, comprising information on battery charging status that indicates the interruption to the charging of the battery and charging error information that indicates the cause of the interruption to the charging of the battery.

10 Claims, 8 Drawing Sheets

(52) U.S. Cl.
CPC ......... *B60L11/1846* (2013.01); *B60L 11/1848* (2013.01); *B60L 11/1861* (2013.01); *H02J 7/0004* (2013.01); *H02J 7/0027* (2013.01); *H02J 7/0047* (2013.01); *B60L 2240/70* (2013.01); *B60L 2240/80* (2013.01); *B60L 2250/10* (2013.01); *B60L 2260/50* (2013.01); *B60L 2270/12* (2013.01); *Y02T 10/705* (2013.01); *Y02T 10/7005* (2013.01); *Y02T 10/7044* (2013.01); *Y02T 10/7055* (2013.01); *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2012/0293122 A1* | 11/2012 | Murawaka | 320/109 |
| 2014/0191568 A1* | 7/2014 | Partovi | 307/9.1 |

* cited by examiner

METHOD FOR CHARGING AN ELECTRIC VEHICLE INCLUDING A BATTERY

CROSS-REFERENCE TO RELATED APPLICATIONS

This application is the National Stage filing under 35 U.S.C. 371 of International Application No. PCT/KR2012/008631, filed on Oct. 19, 2012, which claims the benefit of U.S. Provisional Application Ser. Nos. 61/549,253, filed on Oct. 20, 2011, 61/549,263, filed on Oct. 20, 2011, 61/549,266, filed on Oct. 20, 2011, 61/549,270, filed on Oct. 20, 2011 and 61/606,488, filed on Mar. 5, 2012, the contents of which are all hereby incorporated by reference herein in their entirety.

BACKGROUND

The present disclosure relates to an electric vehicle and an operating method thereof, and particularly, to a method of charging a battery of an electric vehicle.

In order to control global warming through the G20 and G8 countries, a smart grid solution and real-time use of an electric vehicle are suggested to reduce $CO_2$.

An electronic vehicle includes at least one electric motor using an electrical energy of a rechargeable battery. This rechargeable battery may be connected to an electric outlet in order for recharging. In general, it takes a few hours to charge a battery of an electric vehicle. During this process, a user may want to obtain several information.

Moreover, electric grids may have a time interval at which an electrical demand exceeds a limitation. In order to prevent this, constructing a power plant additionally may rather disturb the reduction of $CO_2$. Accordingly, adaptively coping with the demand of electricity by using a large capacity battery of an electric vehicle is required.

For this, users, electric vehicles, and electric power supply facilities may need to exchange information. To this end, various communication techniques may be used.

A wireless home area network (W-HAN), a wireless personal area network (W-PAN), and a wireless frequency transceiver perform communication through a wireless frequency in a short distance area between devices. A Zigbee transceiver may be used as an example. Zigbee is a standard protocol designed for wireless frequency communication in a short distance area. The Zigbee transceiver establishes a mesh network on the basis of IEEE 802.15.4.

A wireless local area network (WLAN) transceiver performs communication through a wireless frequency between devices away from each other by more than 10 m. A Wi-Fi device may be used as an example. The Wi-Fi device follows the IEEE 802.11 standards.

A power line communication (PLC) technique may be used to establish a network between devices through a power line. This technique is limited to an area of up to 100 m.

A wide area network (WAN) is a communication network covering a wide area. The Transmission Control Protocol/Internet Protocol (TCP/IP), that is, a standard protocol, may be used as an example. Additionally, a CDMA or GSM network may be used as an example of a wireless broadband network.

In order to adaptively cope with the demand of electricity by using a high capacity battery of an electric vehicle, demands for exchanging information between users, electric vehicles, and electric power supply facilities are emerging.

SUMMARY

Embodiments provide a device, system, and method for adaptively coping with the demand of electricity by exchanging various information between power use subjects such as users, electric vehicles, and electric power supply facilities.

In one embodiment, an operating method of an electric vehicle including a battery is provided. The method includes: charging the battery through an electric vehicle power supply device; checking an current state of charging of the battery; transmitting a first charging information notification message including information on the current state of charging of the battery to a user terminal device; detecting a charging interruption of the battery; and if the charging interruption of the battery is detected, transmitting a second charging information notification message indicating the charging interruption of the battery to the user terminal device.

The details of one or more embodiments are set forth in the accompanying drawings and the description below. Other features will be apparent from the description and drawings, and from the claims.

DETAILED DESCRIPTION OF THE EMBODIMENTS

Hereinafter, a mobile terminal relating to the present invention is described in more detail with reference to the drawings. The suffixes "module" and "unit" for components used in the description below are assigned or mixed in consideration of easiness in writing the specification and , do not have distinctive meanings or roles by themselves.

Especially, an electric power source in the specification represents an electric power transmitter and an electric power sink represents an electric power receiver.

Then, a network topology according to an embodiment of the present invention will be described with reference to FIG. 1.

Figure 1:
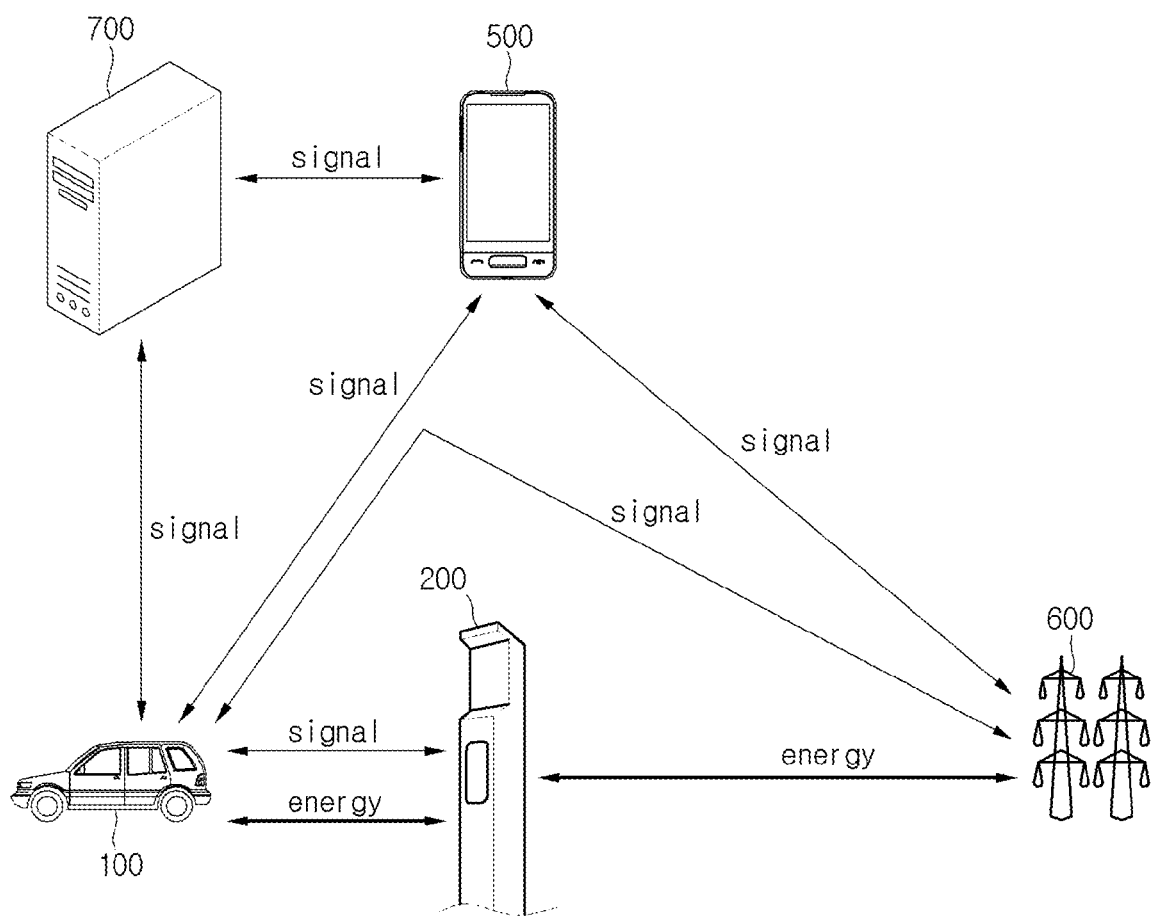
FIG. 1 is a block diagram of a network topology according to an embodiment of the present invention.

FIG. 1 is a block diagram of a network topology according to an embodiment of the present invention.

As shown in FIG. 1, the network topology includes an electric vehicle 100, an electric vehicle power supplying device 200, a user terminal device 500, a power supply facility 600, and a telematics service providing server 700.

For convenience of description, the following abbreviations are used together. An electric vehicle is referred to as its acronym, that is, an EV. Additionally, an electric power supplying device is referred to as an EVSE, that is, the acronym of electric vehicle supply equipment. A user terminal device is referred to as its acronym, that is, an UTD. A telematics service providing server is referred to as TSP, that is, the acronym of a telematics service provider.

Then, an EV 100 according to an embodiment of the present invention will be described with reference to FIG. 2.

Figure 2:
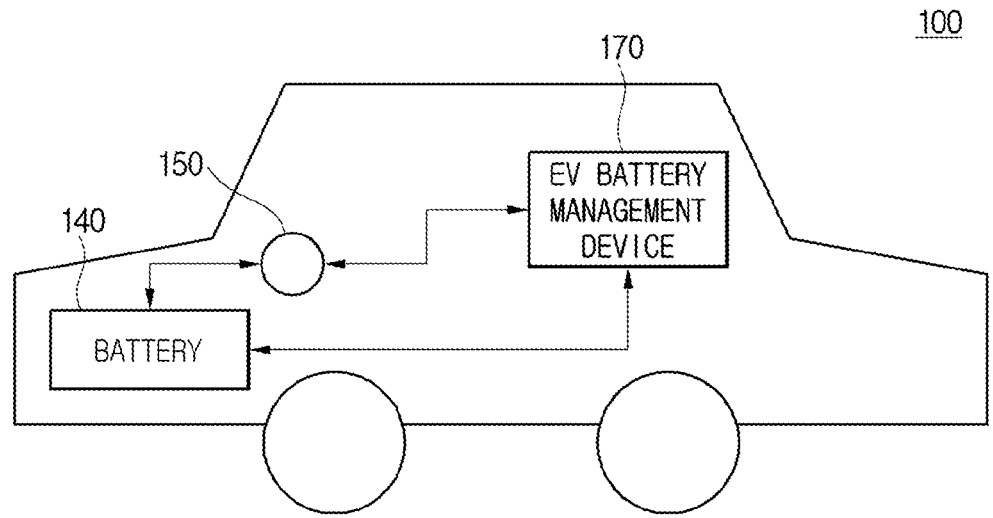
FIG. 2 is a view illustrating an EV according to an embodiment of the present invention.

FIG. 2 is a view illustrating an EV according to an embodiment of the present invention.

As shown in FIG. 2, the EV 100 includes a battery 140, a charging/discharging point 150, and an EV battery management device 170. The charging/discharging point 150 may correspond to an SAE J1772 connector such as an SAE J1772 inlet. The SAE J1772 regulates general physical and electrical requirements and performance requirements assisting the inductive charging of an EV/PHEV in North America. Especially, the SAE J1772 regulates common inductive charging methods of EVs/PHEVs and power supply equipment vehicles in addition to function and specification requirements and operational requirements of vehicle insertions and connectors paring therewith.

Then, an EV battery management device according to an embodiment of the present invention will be described with reference to FIG. 3.

Figure 3:
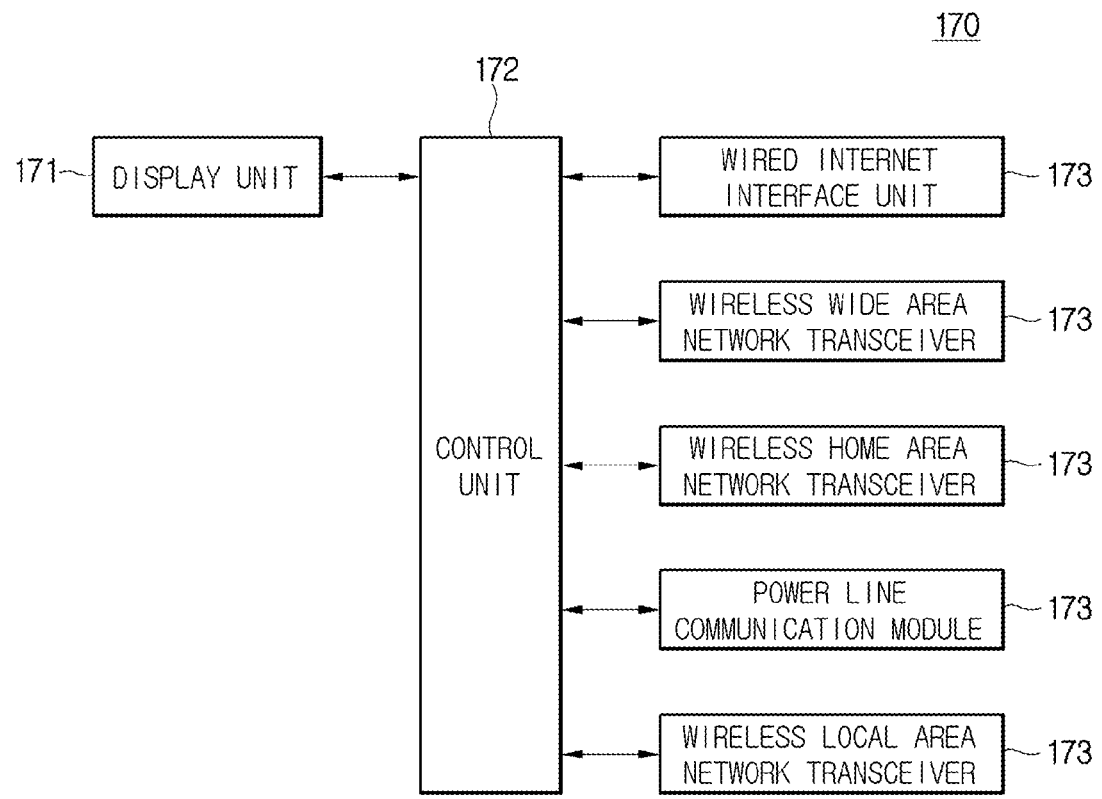
FIG. 3 is a block diagram illustrating an EV battery management device according to an embodiment of the present invention.

FIG. 3 is a block diagram illustrating an EV battery management device according to an embodiment of the present invention.

The EV battery management device 170 is built in the EV 100 and includes a display unit 171, a control unit 172, and at least one communication module 173. The control unit 172 displays a processing status, a system status such as a communication status, and a charging status on the display unit 171. The control unit 172 may control overall management of the battery 140 of the EV 100 and may communicate with an EVSE 200, an UTD 500, a power supply facility 600, a TSP 700 through the at least one communication module 173. The control unit 172 may perform charging management, discharging management, scheduling, and price comparison. The at least one communication module 173 may include at least one of a wired internet interface unit, a WWAN transceiver, a WHAN transceiver, a PLC module, and a WLAN transceiver Hereinafter, communicating with the UTD 500 by the EV battery management device 170 of the EV 100 includes communicating with the UTD 500 through both the EVSE 200 and the TSP 700 by the EV battery management device 170 of the EV 100, communicating with the UTD 500 through the TSP 700 not the EVSE 200 by the EV battery management device 170 of the EV 100, communicating with the UTD 500 through the EVSE 200 not the TSP 700 by the EV battery management device 170 of the EV 100, and communicating with the UTD 500 not through both the EVSE 200 and the TSP 700 by the EV battery management device 170 of the EV 100. Hereinafter, communicating with the UTD 600 by the EV battery management device 170 of the EV 100 includes communicating with the UTD 600 through both the EVSE 200 and the TSP 700 by the EV battery management device 170 of the EV 100, communicating with the UTD 600 through the TSP 700 not the EVSE 200 by the EV battery management device 170 of the EV 100, communicating with the UTD 600 through the EVSE 200 not the TSP 700 by the EV battery management device 170 of the EV 100, and communicating with the UTD 600 not through both the EVSE 200 and the TSP 700 by the EV battery management device 170 of the EV 100.

Then, an EVSE according to an embodiment of the present invention will be described with reference to FIG. 4.

Figure 4:
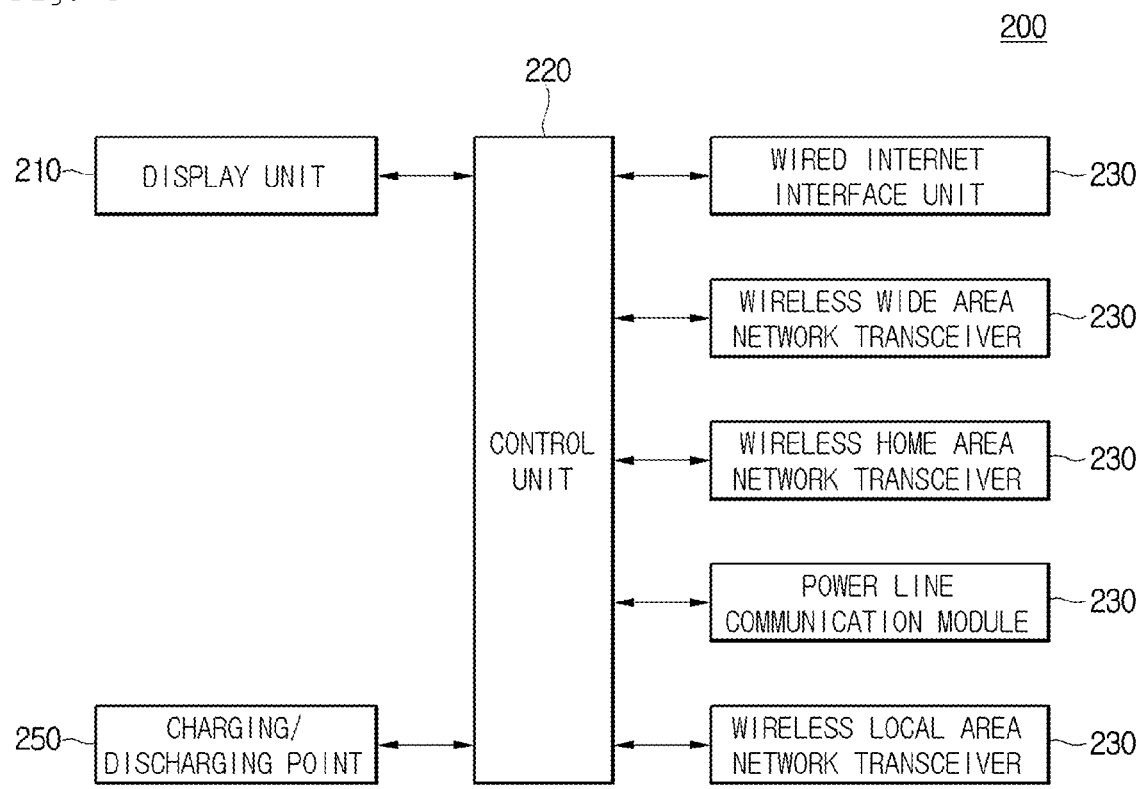
FIG. 4 is a block diagram illustrating an EV battery management device according to an embodiment of the present invention.

FIG. 4 is a block diagram illustrating a display device according to an embodiment of the present invention.

The EVSE 200 is used to charge the EV 100 by receiving electricity from a home power storage device 400 and a power supply facility 600 or discharge the EV 100 by supplying the electricity of the EV 100 to the home power storage device 400 and the power supply facility 600.

As shown in FIG. 4, the EVSE 200 includes a display unit 210, a control unit 220, at least one communication module 230, a charging/discharging point 250. The at least one communication module 230 may include at least one of a wired internet interface unit, a WWAN transceiver, a WHAN transceiver, a PLC module, and a WLAN transceiver The control unit 220 displays a charging status, a discharging status, a notification message, and a charging interruption message on the display unit 210. The control unit 220 may communicate with the EV 100, an EV battery management device 170, a home power storage device 400, an UTD 500, and a power supply facility 600 through the at least one communication module 230. The charging/discharging point 250 may correspond to an SAE J1772 connector such as an SAE J1772 outlet. The charging/discharging point 250 is connected to the charging/discharging point 150 by a user.

Then, the UTD 500 according to an embodiment of the present invention will be described with reference to FIG. 5.

Figure 5:
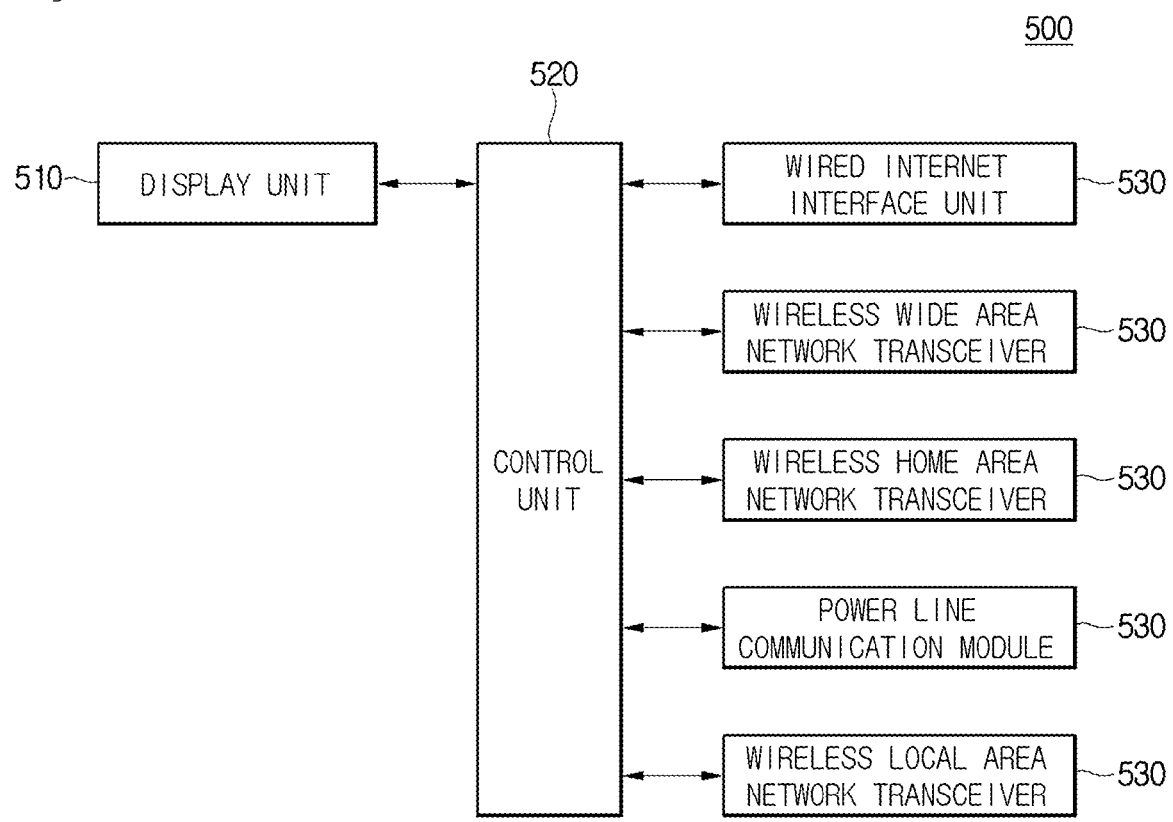
FIG. 5 is a block diagram of an UTD according to an embodiment of the present invention.

FIG. 5 is a block diagram of an UTD according to an embodiment of the present invention.

The UTD 500 includes a display unit 510, a control unit 520, and at least one communication module 530. The control unit 520 displays information on billing, pricing, and timing on the display unit 510. The control unit 520 may communicate with the EV 100, the EVSE 200, the EV battery management device 170, the home power storage device 400, and the power supply facility 600 through the at least one communication module 530. The at least one communication module 530 may include at least one of a wired internet interface unit, a WWAN transceiver, a WHAN transceiver, a PLC module, and a WLAN transceiver Then, a method of charging the EV 100 according to an embodiment of the present invention will be described with reference to FIG. 6.

Figure 6:
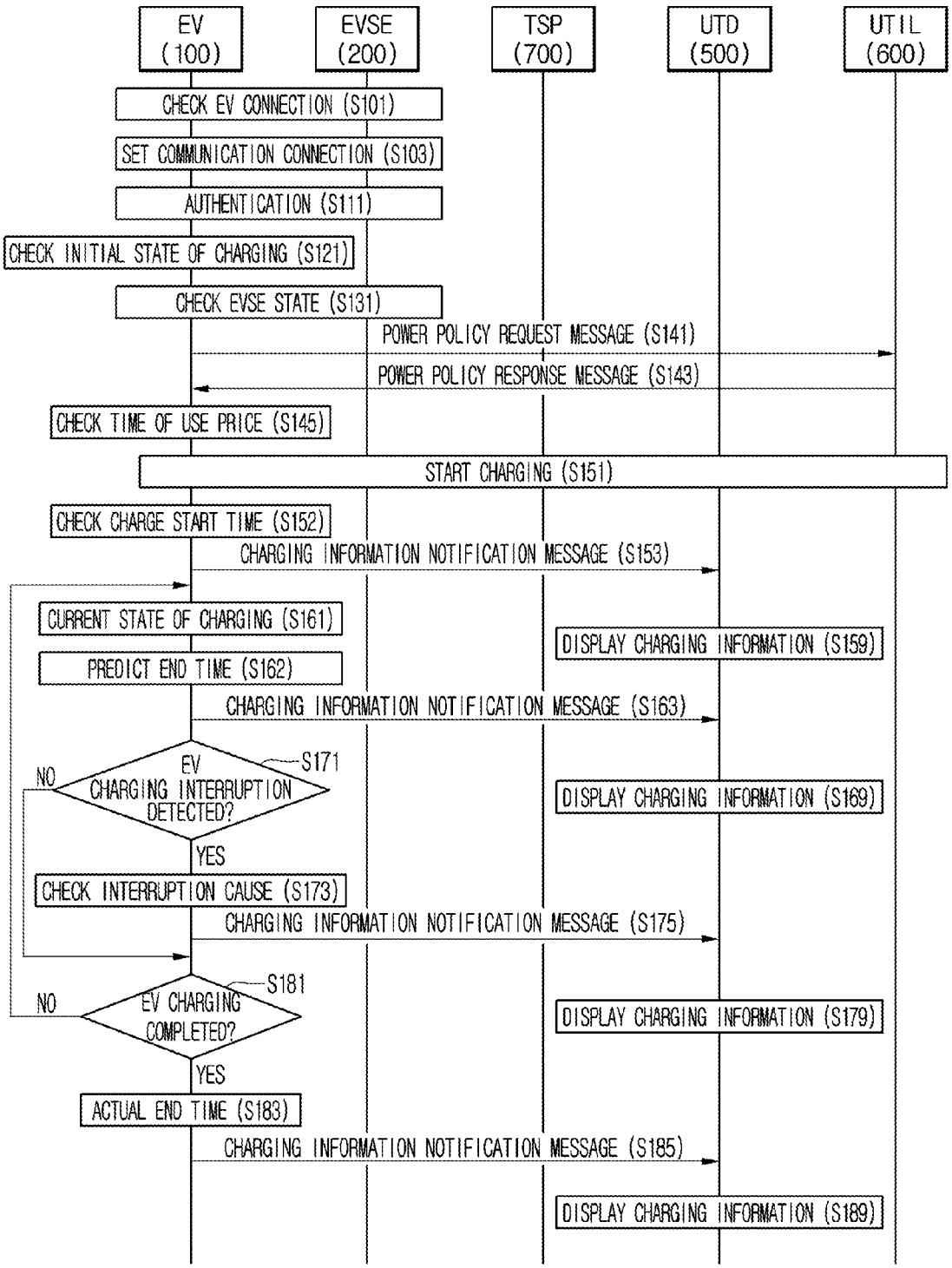
FIG. 6 is a ladder diagram illustrating a charging method of an EV according to an embodiment of the present invention.

FIG. 6 is a ladder diagram illustrating a charging method of an EV according to an embodiment of the present invention.

The control unit 172 of the EV battery management device 170 in the EV 100 checks whether the charging/discharging point 150 is connected to the charging/discharging point 250 of the EVSE 200 in operation S101.

When the charging/discharging point 150 of the EV 100 is connected to the charging/discharging point 250 of the EVSE 200, the control unit 172 of the EV battery management device 170 in the EV 100 sets a communication connection with the EVSE 200 in operation S103.

If a communication connection setting is failed, the control unit 172 of the EV battery management device 170 in the EV 100 may transmit a charging information notification message including EV charging situation information indicating a charging start failure and EV charging error information indicating a communication connection setting failure, to the UTD 500. Then, the control unit 172 of the EV battery management device 170 in the EV 100 stops starting the charging of the battery 140 of the EV 100.

If the communication connection setting is failed, the UTD 500 may display that charging start is failed due to the communication connection setting failure between the EV 100 and the EVSE 200.

If the communication connection setting is successful, the control unit 172 of the EV battery management device 170 in the EV 100 performs an authentication operation with the EVSE 200 through a set communication connection by using SAE J2836-1 and SAE J2847-1. SAE J2836-1 and SAE J2847-1 regulate the requirements, specifications, and use cases for communications between plug-in EVs and electrical power grids in order for energy transmission and other applications.

If an authentication is failed, the control unit 172 of the EV battery management device 170 in the EV 100 may transmit a charging information notification message including EV charging situation information indicating a charging start failure and EV charging error information indicating an authentication failure, to the UTD 500. Then, the control unit 172 of the EV battery management device 170 in the EV 100 stops starting the charging of the battery 140 of the EV 100.

If the authentication is failed, the UTD 500 may display that charging start is failed due to the authentication failure between the EV 100 and the EVSE 200.

The control unit 172 of the EV battery management device 170 in the EV 100 checks an initial state of charging (SOC) of the battery 140 in operation S121. That is, the control unit 172 of the EV battery management device 170 in the EV 100 checks whether the initial SOC of the battery 140 corresponds to the maximum charging capacity of the battery 140.

If the initial SOC of the battery 140 corresponds to the maximum charging capacity of the battery 140, the control unit 172 of the EV battery management device 170 in the EV 100 may transmit a charging information notification message including EV charging situation information indicating a charging start failure and EV charging error information indicating that the initial SOC of the battery 140 corresponds to the maximum charging capacity of the battery 140, to the UTD 500. Then, the control unit 172 of the EV battery management device 170 in the EV 100 stops starting the charging of the battery 140 of the EV 100.

When the initial SOC of the battery 140 corresponds to the maximum charging capacity of the battery 140, the UTD 500 may display that charging start is failed due to the fact that the initial SOC of the battery 140 corresponds to the maximum charging capacity of the battery 140.

If the initial SOC of the battery 140 is less than the maximum charging capacity of the battery 140, the control unit 172 of the EV battery management device 170 in the EV 100 checks whether the EVSE 200 is capable of providing power to the EV in operation S131.

If the EVSE 200 is not capable of providing power to the EV 100, the control unit 172 of the EV battery management device 170 in the EV 100 may transmit a charging information notification message including EV charging situation information indicating a charging start failure and EV charging error information indicating that the EVSE 200 is not capable of providing power to the EV 100, to the UTD 500. Then, the control unit 172 of the EV battery management device 170 in the EV 100 stops starting the charging of the battery 140 of the EV 100.

When the EVSE 200 is not capable of providing power to the EV 100, the UTD 400 may display charging start is failed due to the fact that the EVSE 200 is not capable of providing power to the EV 100.

Moreover, the control unit 172 of the EV battery management device 170 in the EV 100 transmits a power policy request message to the power supply facility 600 in operation S141.

Upon the receipt of the power policy request message from the EV 100, the power supply facility 600 transmits a power policy response message including information on a power policy to the EV 100 in operation S143. At this point, the information on a power policy may include at least one of information on a power sale available time zone, information on a power purchase available time zone, and information on a TOU electricity price. The power sale available time zone is a time zone in which the power supply facility 600 is capable of selling power to the outside and the power purchase available time zone is a time zone in which the power supply facility 600 is capable of purchasing power from the outside. The TOU electricity price may include part or all of information on a TOU electricity sale price and information on a TOU electricity purchase price. The TOU electricity sale price is a price of when the power supply facility 600 sells electricity to the outside and the TOU electricity purchase price is a price of when the power supply facility 600 purchases electricity from the outside.

When the EVSE 200 is capable of providing power to the EV 100, the control unit 172 of the EV battery management device 170 in the EV 100 checks whether a TOU electricity price is valid in operation S145. If a TOU electricity price at the current time is equal to or less than an electricity price that a user wants, the control unit 172 of the EV battery management device 170 in the EV 100 may determine that the TOU electricity price is valid. If the TOU electricity price at the current time is greater than the electricity price that the user wants, the control unit 172 of the EV battery management device 170 in the EV 100 may determine that the TOU electricity price is invalid.

If the TOU electricity price is invalid, the control unit 172 of the EV battery management device 170 in the EV 100 may transmit a charging information notification message including EV charging status information indicating a charging start failure and EV charging error information indicating the TOU electricity price is invalid, to the UTD 500. Then, the control unit 172 of the EV battery management device 170 in the EV 100 stops starting the charging of the battery 140 of the EV 100.

If the TOU electricity price is invalid, the UTD 500 may display that charging start is failed due to the fact that the TOU electricity price is invalid.

If a TOU electricity price is valid, the control unit 172 of the EV battery management device 170 in the EV 100 starts charging the battery 140 by using the power of the power supply facility 600 through the EVSE 200 in operation S151.

The control unit 172 of the EV battery management device 170 in the EV 100 checks the charge start time of the battery 140 in operation S152.

Then, the control unit 172 of the EV battery management device 170 in the EV 100 transmits a charging information notification message to the UTD 500 in operation S153. The charging information notification message may include charging information on charging of an EV battery. At this point the charging information may include part or all of an initial SOC, a current SOC, a charge start time, an estimated charge end time, an actual charge end time, an EV charging status, and EV charging error information Especially, at this point, the current SOC may be identical to the initial SOC; an EV charging status may indicate charging start; and the EV charging error information may indicate no charging error.

Upon the receipt of a charging information notification message, the UTD 500 displays charging information therein in operation S159.

The UTD 500 may display part or all of an initial SOC, a current SOC, a charge start time, and an estimated charge end time and also may display that charging starts and there is no error in charging.

The control unit 172 of the EV battery management device 170 in the EV 100 checks the current SOC of the battery 140 during charging periodically in operation S161.

The control unit 172 of the EV battery management device 170 in the EV 100 predicts the estimated charge end time of the battery 140 on the basis of the current SOC and charging speed of the battery 140 in operation S162.

During charging, the control unit 172 of the EV battery management device 170 in the EV 100 transmits a charging information notification message to the UTD 500 in operation S163. The EV 100 may transmit the charging information notification message to the UTD 500 periodically. The charging information notification message may include charging information on charging of an EV battery. At this point the charging information may include part or all of an initial SOC, a current SOC, a charge start time, an estimated charge end time, an EV charging status, and EV charging error information The EV charging status may indicate charging in progress and the EV charging error information may indicate no charging error.

Upon the receipt of a charging information notification message, the UTD 500 displays charging information therein in operation S169.

Figure 7:
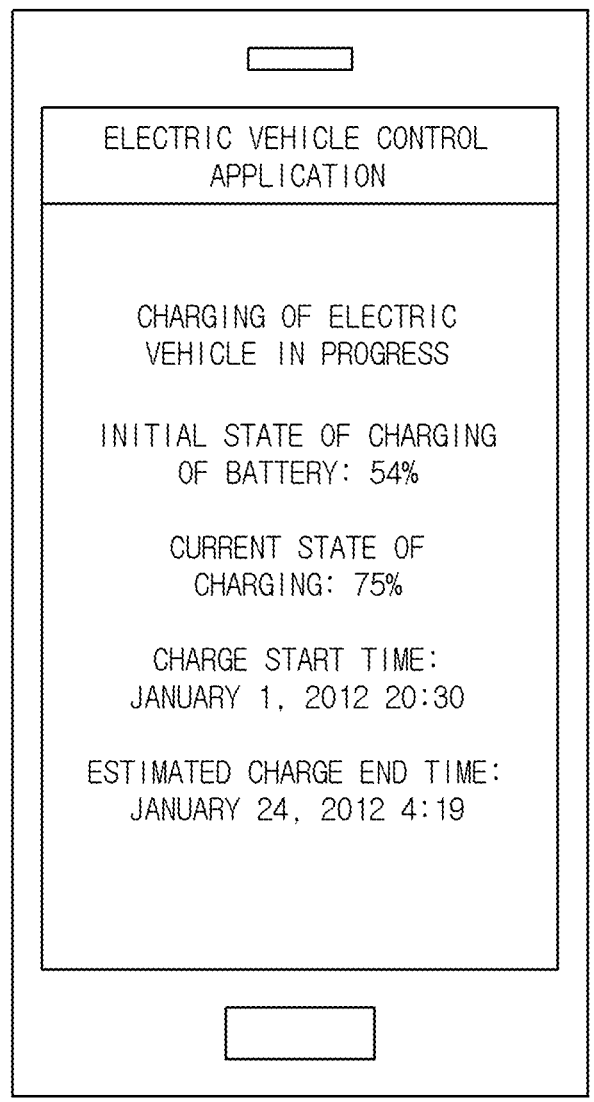
FIG. 7 is a view illustrating a screen displayed on an UTD according to an embodiment of the present invention.

FIG. 7 is a view illustrating a screen displayed on an UTD according to another embodiment of the present invention.

As shown in FIG. 7, the UTD 500 may display part or all of an initial SOC, a current SOC, a charge start time, and an estimated charge end time and also may display that charging is in progress and there is no error in charging.

The control unit 172 of the EV battery management device 170 in the EV 100 detects the charging interruption of the battery 140 on the basis of the current SOC of the battery 140 in operation S171.

If the charging interruption of the battery 140 is detected, the control unit 172 of the EV battery management device 170 in the EV 100 stops charging the battery 140 and checks the cause of the charging interruption of the battery 140 in operation S173.

If the charging interruption of the battery 140 is detected, the control unit 172 of the EV battery management device 170 in the EV 100 transmits a charging information notification message to the UTD 500 in operation S175. The charging information notification message may include charging information on charging of an EV battery. At this point the charging information may include part or all of an initial SOC, a current SOC, a charge start time, an estimated charge end time, an actual charge end time, an EV charging status, and EV charging error information Especially, at this point, the EV charging status may indicate charging stop due to interruption after charging start is successful and the EV charging error information may indicate the cause of charging interruption. The cause of charging interruption in the EV 100 may be an EVSE incapable of providing power during charging and an unplugged plug.

Upon the receipt of a charging information notification message, the UTD 500 displays charging information therein in operation S179.

The UTD 500 may display part or all of an initial SOC, a current SOC, a charge start time, an estimated charge end time, and an actual charge end time and also may display charging stop due to interruption after charging start is successful and the cause of charging interruption of the EV 100.

Figure 8:
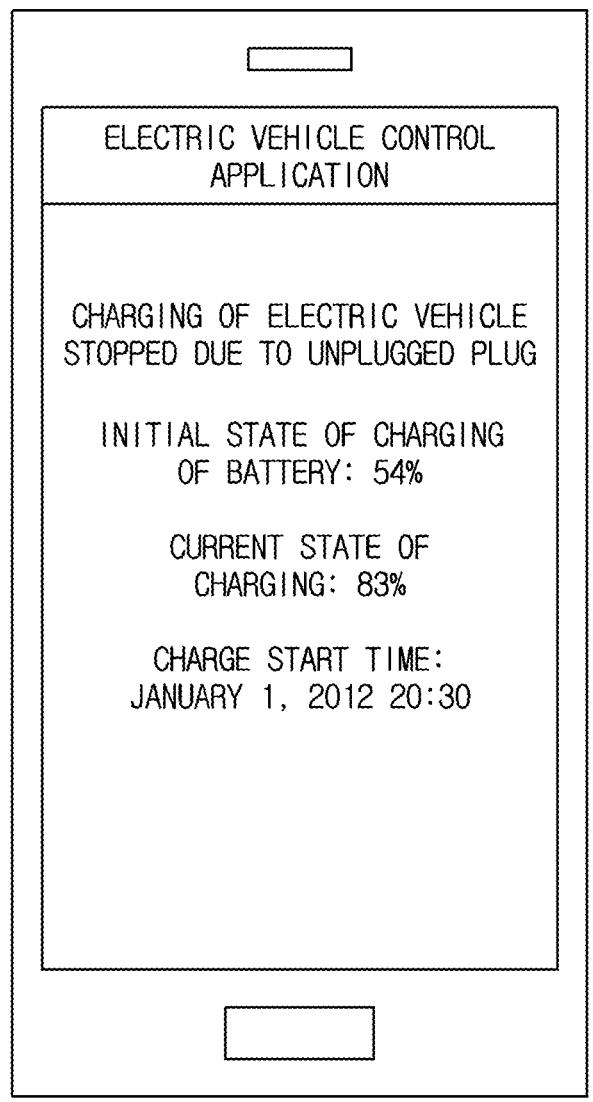
FIG. 8 is a view illustrating a screen displayed on an UTD according to another embodiment of the present invention.

FIG. 8 is a view illustrating a screen displayed on an UTD according to another embodiment of the present invention.

As shown in FIG. 8, the UTD 500 may display charging stop due to interruption after charging start is successful, the cause of charging interruption of the EV 100, an initial SOC, a current SOC, and a charge start time.

Again, FIG. 6 is described.

The control unit 172 of the EV battery management device 170 in the EV 100 detects the charging completion of the battery 140 on the basis of the current SOC of the battery 140 in operation S181.

The control unit 172 of the EV battery management device 170 in the EV 100 checks the actual charge end time of the battery 140 in operation S183.

If the charging completion of the battery 140 is detected, the control unit 172 of the EV battery management device 170 in the EV 100 transmits a charging information notification message to the UTD 500 in operation S185. The charging information notification message may include charging information on charging of an EV battery. At this point the charging information may include part or all of an initial SOC, a current SOC, a charge start time, an estimated charge end time, an actual charge end time, an EV charging status, and EV charging error information Especially, at this point, the EV charging status may indicate charging completion and the EV charging error information may indicate no charging error.

Upon the receipt of a charging information notification message, the UTD 500 displays charging information therein in operation S189.

Figure 9:
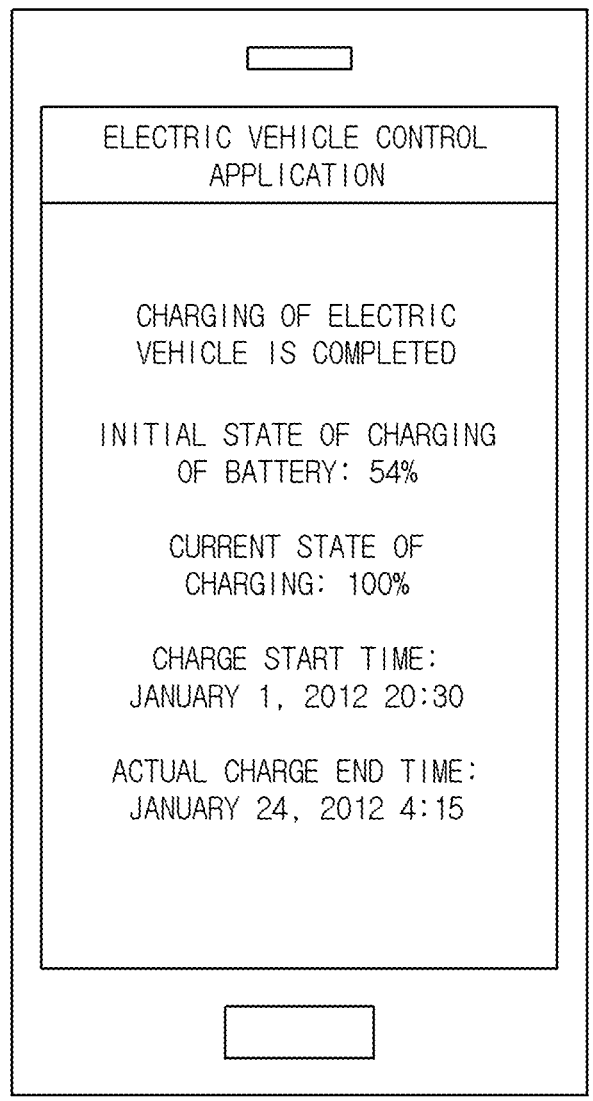
FIG. 9 is a view illustrating a screen displayed on an UTD according to another embodiment of the present invention.

FIG. 9 is a view illustrating a screen displayed on an UTD according to another embodiment of the present invention.

As shown in FIG. 9, the UTD 500 may display part or all of an initial SOC, a current SOC, a charge start time, and an estimated charge end time, and an actual charge end time and also may display that charging is completed.

According to an embodiment of the present invention, by exchanging various information between power use subjects such as UTDs, EVs, EVSEs, built-in vehicle communication control devices, home power storage devices, and power supply facilities, it is possible to adaptively deal demands for electricity. Thus, this may contribute to the protection of environment.

According to an embodiment of the present invention, the above method also can be embodied as computer readable codes on a computer readable recording medium having a program recorded thereon. Examples of the computer readable recording medium include read-only memory (ROM), random-access memory (RAM), CD-ROMs, magnetic tapes, floppy disks, and optical data storage devices and also include carrier waves (such as data transmission through the Internet).

The above-described mobile terminal is not applied as limited to the configurations and methods of the above embodiments. Some or all of the above embodiments are selectively combined and configured to provide various modifications.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for charging an electric vehicle including a battery, the method comprising:

performing a communication connection setting with the electric vehicle power supply device when an SAE J1772 connector is connected;
performing an authentication operation on an electric vehicle power supply device when the communication connection setting is successful;
charging the battery via the electric vehicle power supply device when the authentication operation is successful;
checking a current charging state of the battery;
transmitting a first charging information notification message including information related to the current charging state of to a user terminal device;
detecting a charging interruption of the battery; and
transmitting a second charging information notification message indicating the detected charging interruption to the user terminal device.

2. The method according to claim 1, wherein the charging interruption of the battery is detected based on the current charging state.

3. The method according to claim 2, further comprising, determining a cause of the detected charging interruption,
wherein the second charging information notification message comprises battery charging status information indicating the detected charging interruption and charging error information indicating the determined cause.

4. The method according to claim 3, wherein the second charging information notification message further comprises information related to at least an initial charging state of the battery, the current charging state of the battery, or a charge start time of the battery.

5. The method according to claim 1, wherein the first charging information notification message comprises battery charging status information indicating that the battery is charging.

6. The method according to claim 1, further comprising checking an initial charging state of the battery, wherein the first charging information notification message comprises information related to the initial charging state.

7. The method according to claim 1, further comprising determining a charge start time of the battery, wherein the first charging information notification message comprises information related to the charge start time.

8. The method according to claim 1, further comprising estimating a charge end time of the battery based on the current charging state, wherein the first charging information notification message comprises information related to the charge end time.

9. The method according to claim 1, wherein the authentication operation is performed via SAE J2836-1 and SAE J2847-1.

10. The method according to claim 1, wherein:
the current charging state is checked periodically; and
the first charging information notification message is transmitted periodically.

* * * * *